(12) United States Patent
Chen et al.

(10) Patent No.: US 8,757,411 B2
(45) Date of Patent: Jun. 24, 2014

(54) ELECTRONIC DEVICE ENCLOSURE

(75) Inventors: Yun-Lung Chen, New Taipei (TW); Chung Chai, New Taipei (TW); Da-Long Sun, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/571,454

(22) Filed: Aug. 10, 2012

(65) Prior Publication Data

US 2013/0147324 A1 Jun. 13, 2013

(30) Foreign Application Priority Data

Dec. 8, 2011 (CN) .......................... 2011 1 0405465

(51) Int. Cl.
*B65D 6/28* (2006.01)
*H02G 3/08* (2006.01)

(52) U.S. Cl.
USPC .............................. 220/4.02; 220/3.8; 220/3.7

(58) Field of Classification Search
USPC .......... 220/3.7, 3.8, 4.02, 811, 813, 820, 823; 292/163, 164, 169, 175; 312/215, 216, 312/222, 223.2; 361/600, 679.01, 679.31, 361/679.57, 679.58, 724, 725, 726, 727
See application file for complete search history.

(56) References Cited

U.S. PATENT DOCUMENTS

| | | | |
|---|---|---|---|
| 4,636,781 A * | 1/1987 | Wills et al. ................. | 312/208.1 |
| 6,015,195 A * | 1/2000 | Anderson et al. .......... | 312/223.2 |
| 6,870,731 B2 * | 3/2005 | Lin et al. ................... | 361/679.58 |
| 8,297,088 B1 * | 10/2012 | Zhang et al. ..................... | 70/58 |
| 2005/0185370 A1 * | 8/2005 | Chung .......................... | 361/683 |
| 2013/0130559 A1 * | 5/2013 | Chen ............................ | 439/660 |

* cited by examiner

*Primary Examiner* — Anthony Stashick
*Assistant Examiner* — Kaushikkumar Desai
(74) *Attorney, Agent, or Firm* — Novak Druce Connolly Bove + Quigg LLP (57) ABSTRACT

An electronic device enclosure includes a rear plate defining a through hole, a side plate having a hook, a clipping device, and a rotating device. The clipping device includes a clipping member and a first resilient member. The clipping member may slide relative to the rear plate between a lock position and an unlock position. When the clipping member is located in the clock position, the hook is engaged in the through hole. When the clipping member is located in the unlock position, the hook is disengaged from the through hole. The rotating device is rotatably coupled to the side plate and may drive the clipping member to slide from the lock position to the unlock position. The first resilient member may drive the clipping member to slide from the unlock position to the lock position.

18 Claims, 8 Drawing Sheets

ELECTRONIC DEVICE ENCLOSURE

BACKGROUND

1. Technical Field

The present disclosure relates to an electronic device enclosure.

2. Description of Related Art

An electronic device enclosure, such as a personal computer case, often includes a base and a side plate secured to the base with a plurality of screws. Using screws is very laborious and time-consuming. Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIGS. 1-5 illustrate an electronic device enclosure in accordance with an embodiment. The electronic device enclosure includes a base 20, a clipping device 30 attached to the base 20, a side plate 40 attached to the base 20, and a rotating device 50 rotatably attached to the side plate 40.

Figure 2:
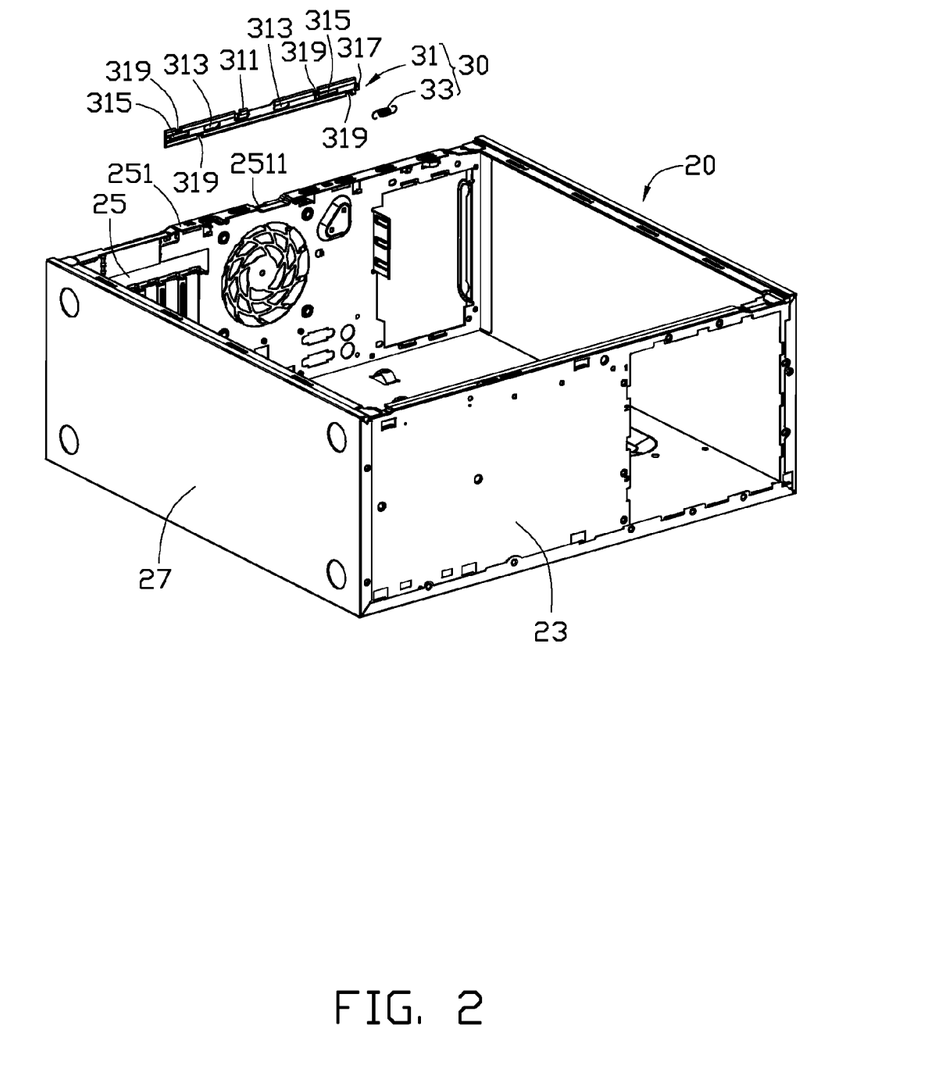
FIG. 2 is an exploded, isometric view of a base and a clipping device of the electronic device enclosure of FIG. 1.

Referring to FIG. 2, the base 20 includes a bottom plate 21, a front plate 23, a rear plate 25, a first side plate 27, and a second side plate 29. The front plate 23 and the rear plate 25 are connected to two opposite sides of the bottom plate 21. The first side plate 27 and the second side plate 29 are connected to another two opposite sides of the bottom plate 21. The front plate 23, the rear plate 25, the first side plate 27 and the second side plate 29 are substantially perpendicular to the bottom plate 21. A front plate flange 231 extends from a top edge of the front plate 23 and towards inside of the base 20. A rear plate flange 251 extends from a top edge of the rear plate 25 and towards inside of the base 20. A first side plate flange 271 extends from a top edge of the first side plate 27 and towards inside of the base 20. A second side plate flange 291 extends from a top edge of the second side plate 29 and towards inside of the base 20. A clipping hole 2511 is defined in the rear plate flange 251.

Figure 1:
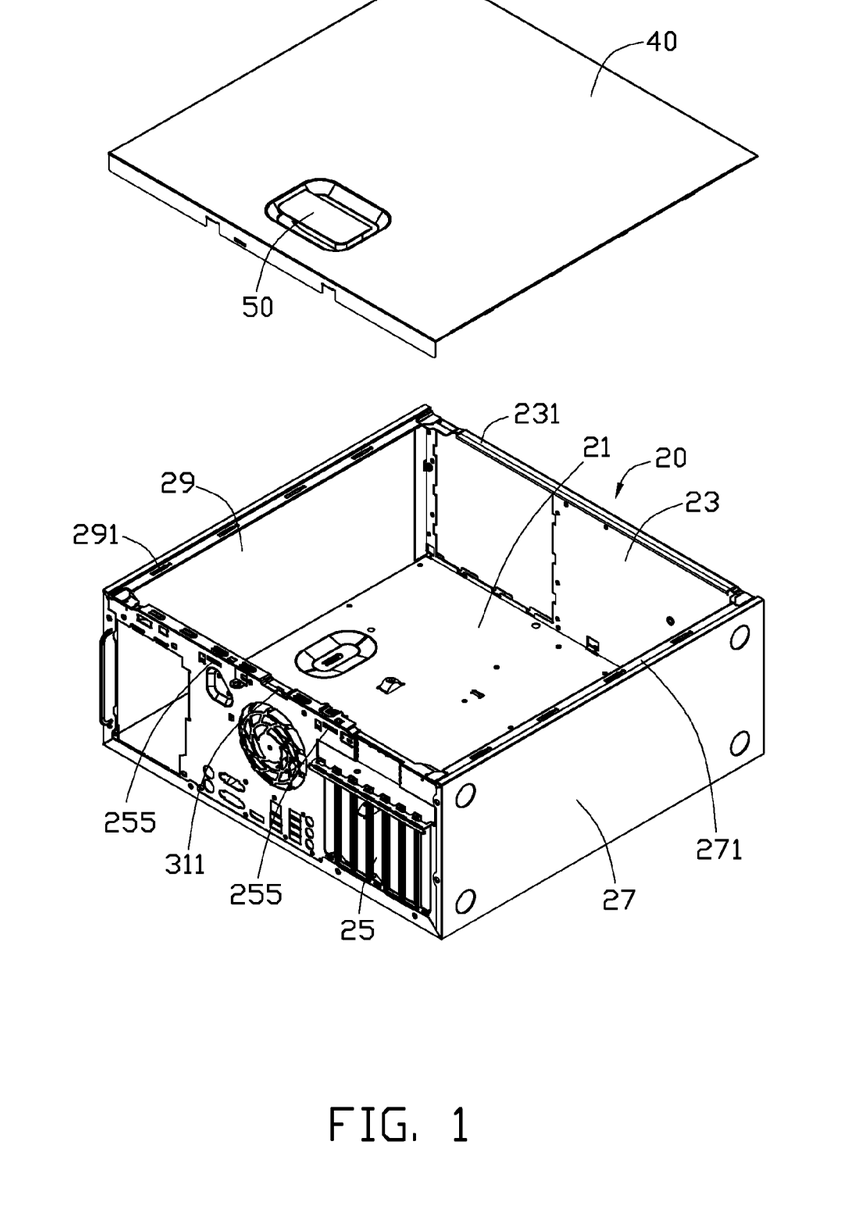
FIG. 1 is an isometric view of an electronic device enclosure in accordance with an embodiment.
Figure 6:
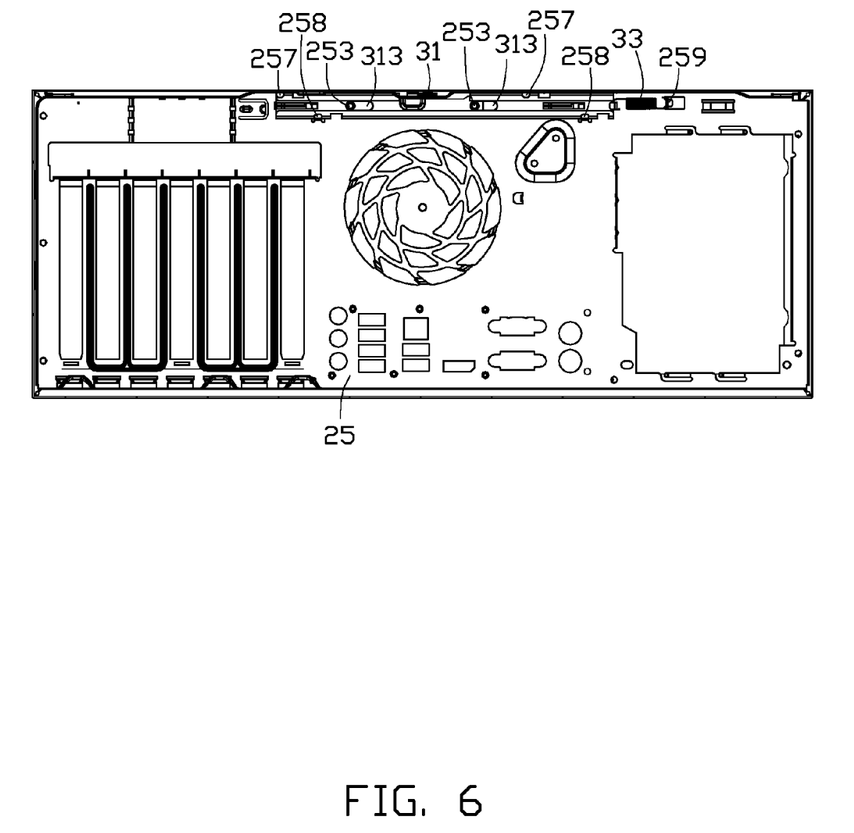
FIG. 6 is a side view of a rear plate of the base and the clipping device of FIG. 1, showing the clipping device located in a locked position.

Referring to FIG. 6, two spaced posts 253 protrude from an interior side of the rear plate 25 and are adjacent to the rear plate flange 251. The rear plate 25 defines two through holes 255 beside the two posts 253 as shown in FIG. 1. The two through holes 255 and the two posts 253 are arranged substantially in a line. An upper limiting portion 257 is defined above each of the two through holes 255. A lower limiting portion 258 is defined below each of the two through holes 255. The two upper limiting portions 257 are arranged substantially in a line. The two lower limiting portions 258 are arranged substantially in a line. A first hook portion 259 is located beside the left through hole 255 and flush with the left through hole 255.

Referring to FIG. 2 again, the clipping device 30 includes a clipping member 31 and a first resilient member 33. In some embodiments, the first resilient member 33 is an extension spring. The clipping member 31 has a substantially rectangular shape. A clipping portion 311 is located in the middle of a top edge of the clipping member 31. The clipping member 31 defines two sliding holes 313 beside the clipping portion 311. Two clipping holes 315 are defined beside the two sliding holes 313. A second hook portion 317 is located at the left end of the clipping member 31. A plurality of cutouts 319 are defined in the top and bottom edges of the clipping member 31.

Figure 3:
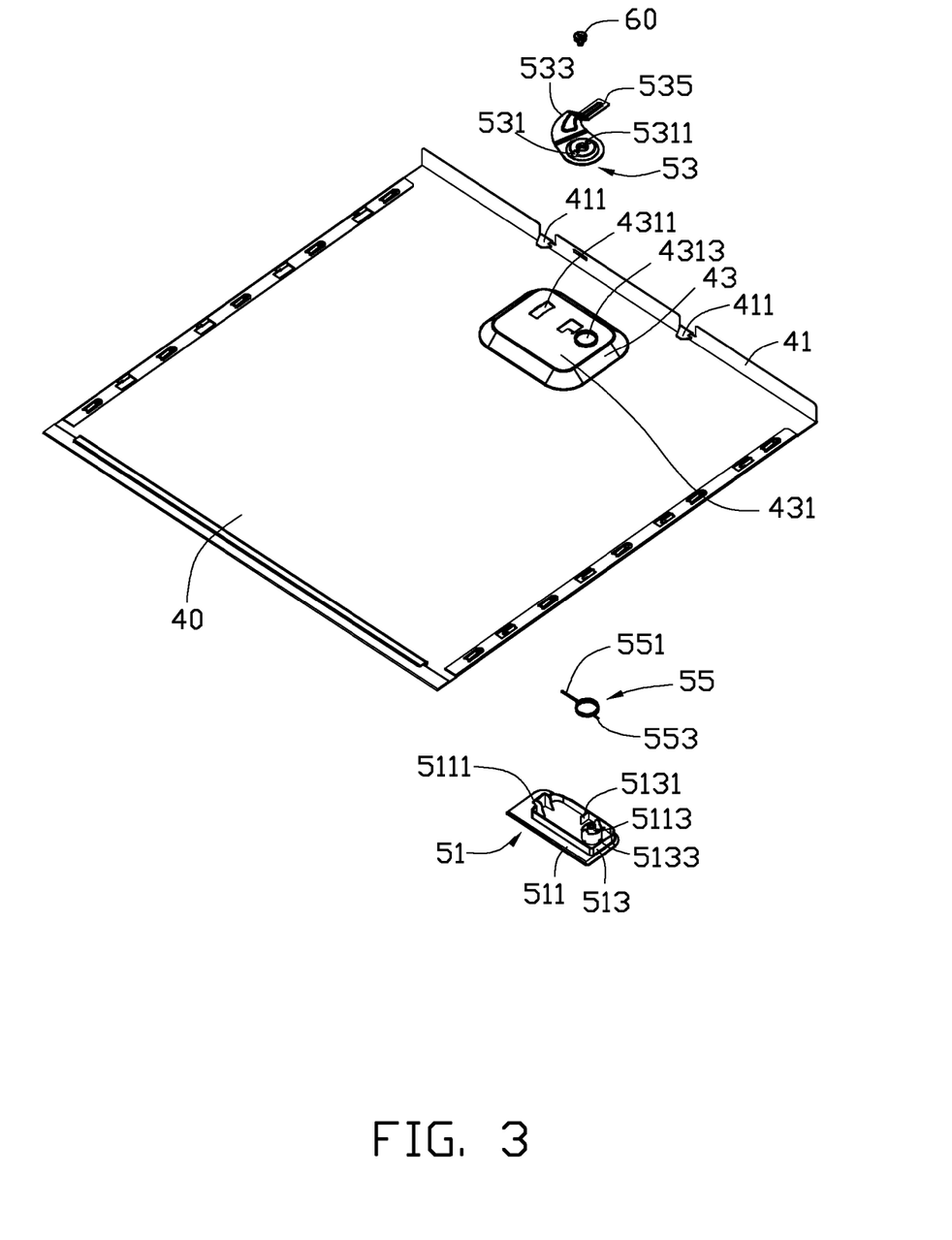
FIG. 3 is an exploded, isometric view of a side plate and a rotating device of the electronic device enclosure of FIG. 1.
Figure 4:
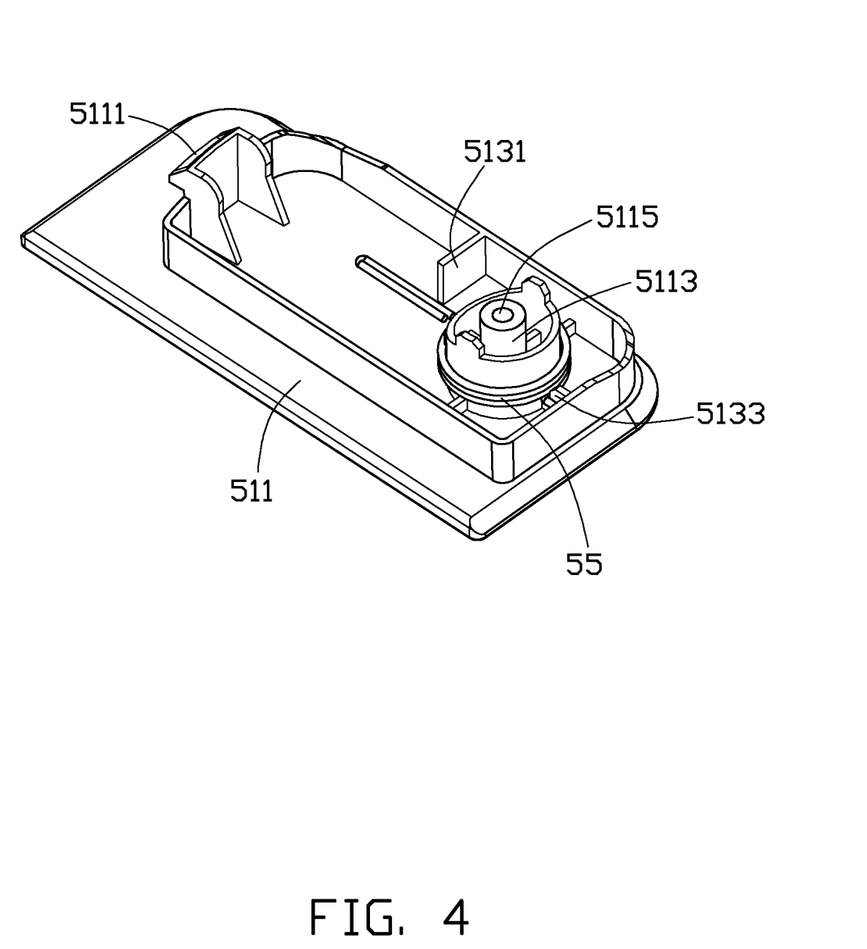
FIG. 4 is a partially assembled view of FIG. 3.
Figure 5:
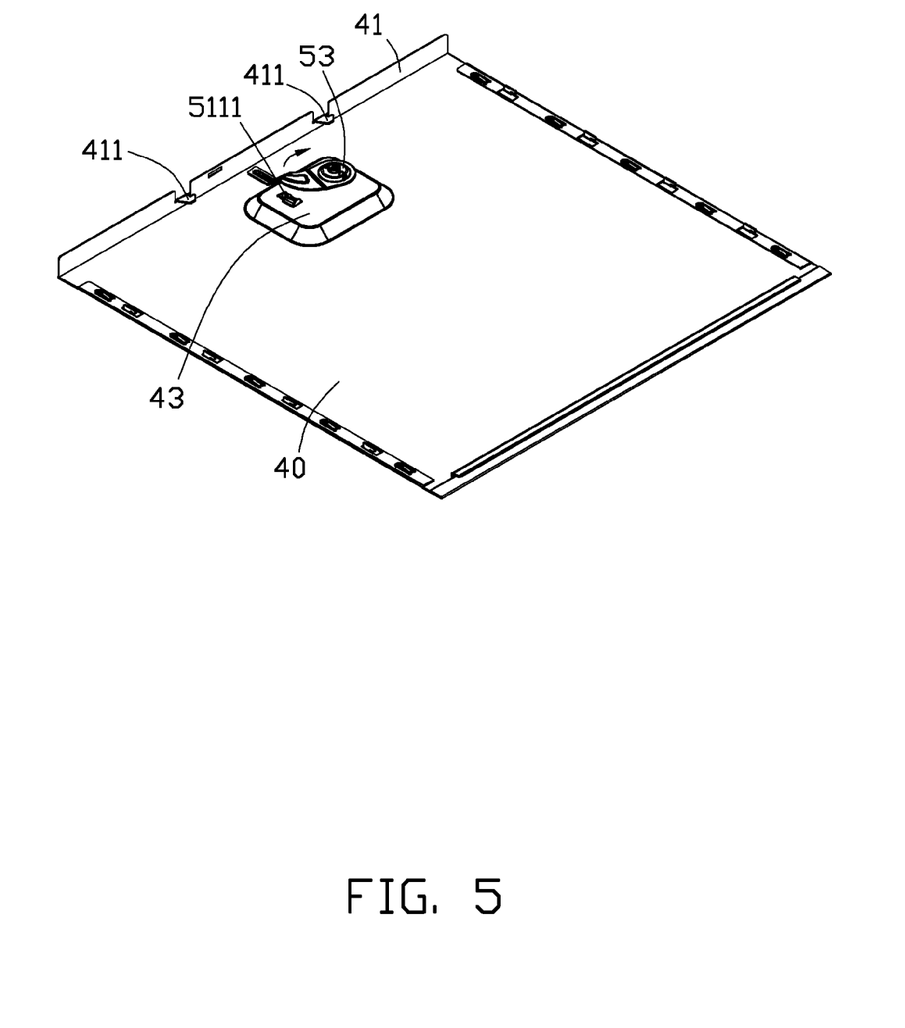
FIG. 5 is an assembled view of FIG. 3.

Referring to FIGS. 3 and 4, a side plate flange 41 extends from an edge of the side plate 40. The side plate flange 41 is bent with two hooks 411 extending towards inside of the side plate flange 41. The two hooks 411 are located in a plane substantially parallel to the side plate 40. The side plate flange 41 includes a recess portion 43 adjacent to the side plate flange 41. A rotating hole 4311 and a first mounting hole 4313 are defined a bottom portion 431 of the recess portion 43.

The rotating device 50 includes a handle 51, a driving lever 53, and a second resilient member 55. The driving lever 53 is attached to the handle 51. The resilient member 55 is mounted to the handle 51. The handle 51 includes an operating portion 511 and a supporting portion 513. The supporting portion 513 protrudes from the operating portion 511. The handle 51 further includes a sliding portion 5111 and a rotating portion 5113 nested in the supporting portion 513. The rotating portion 5113 is substantially cylinder-shaped. The rotating portion 5113 defines a pivot hole 5115 as shown in FIG. 4. A first blocking tab 5131 and a second blocking tab 5133 protrude from an interior side of the supporting portion 513 and surround the rotating portion 5113. The first blocking tab 5131 is substantially perpendicular to the second blocking tab 5133.

The driving lever 53 includes a mounting portion 531, a bent portion 533, and a sliding shaft 535. A second mounting hole 5311 is defined in the center of the mounting portion 531. The bent portion 533 extends from the mounting portion 531 and is connected to the sliding shaft 535. The driving lever 53 is substantially comma-shaped.

The second resilient member 55 includes a first end 551 and a second end 553. In certain embodiments, the second resilient member 55 is a torsional spring.

Figure 8:
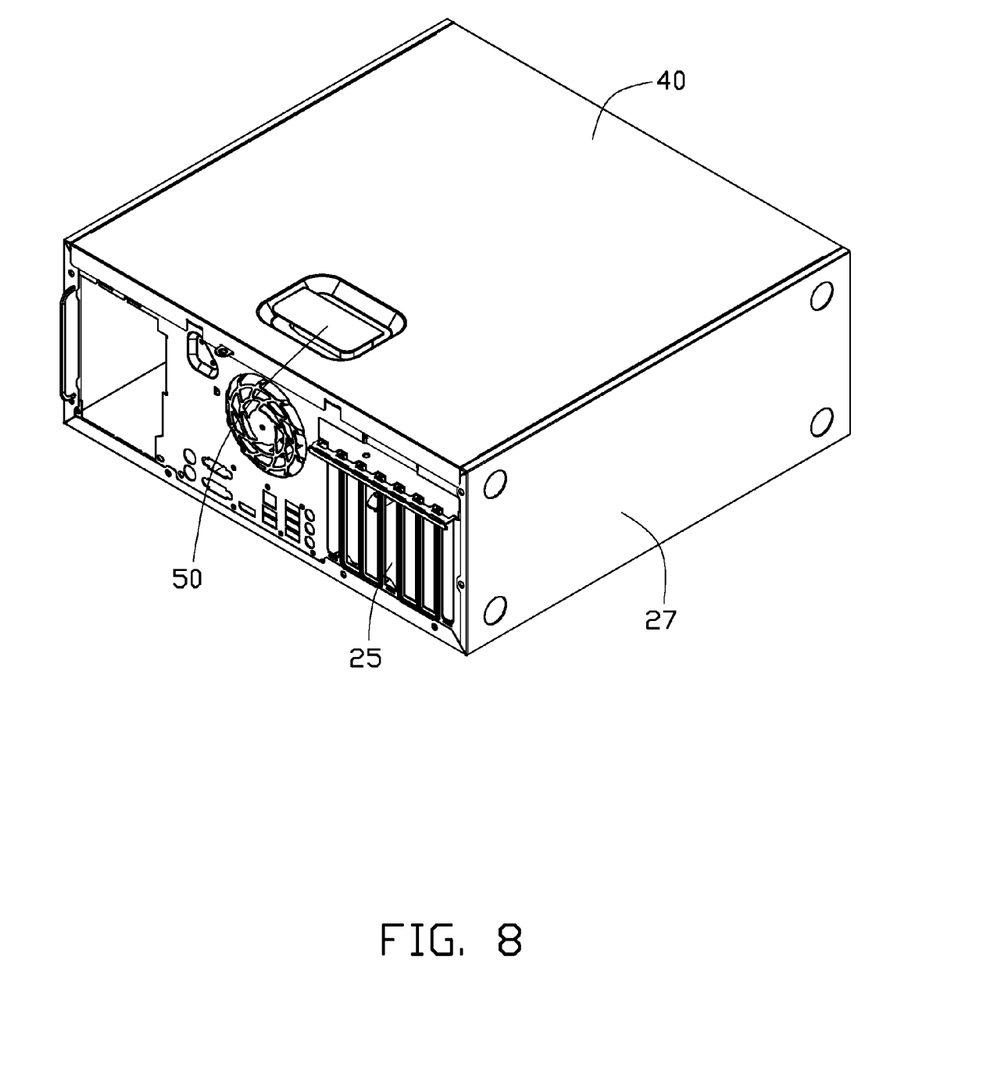
FIG. 8 is an assembled view of FIG. 1.

FIG. 8 illustrates an assembly of the electronic device enclosure in accordance with an embodiment. In assembly, the clipping device 30 is mounted to the base 20. The clipping device 30 is placed parallel to the rear plate 25. The clipping portion 311 of the clipping member 31 extends through the clipping hole 2511 of the rear plate flange 251. The clipping member 31 is adjusted to make the upper limiting portions 257 and the lower limiting portions 258 of the rear plate 25 extend through the cutouts 319 of the clipping member 31. The two posts 253 of the rear plate 25 are received in the two sliding holes 313 of the clipping member 31. Thus, the top and bottom edges of the clipping member 31 are received and limited by the upper limiting portions 257 and the lower limiting portions 258, hence the clipping member 31 is slidable relative to the rear plate 25. When the upper limiting portions 257 and the lower limiting portions 258 are positioned away from the cutouts 319 by sliding the clipping member 31, the clipping member 31 is prevented from moving away from the rear plate 25. One end of the first resilient member 33 is connected to the first hook portion 259 and the other end of the first resilient member 33 is connected to the second hook portion 317. The first resilient member 33 is mounted between the clipping member 31 and the first hook portion 259. Thereby, the clipping device 30 is mounted to the rear plate 25.

The second resilient member 55 is placed around the rotating portion 5113 of the handle 51. The first end 551 of the second resilient member 55 abuts the first blocking tab 5131. The second end 553 of the second resilient member 55 abuts the second blocking tab 5133. The sliding portion 5111 extends through the rotating hole 4311 of the recess portion 43 and is clipped by the bottom portion 431 of the recess portion 43. The handle 51 is adjusted to make the rotating portion 5113 be inserted and received in the first mounting hole 4313. The second mounting hole 5311 of the mounting portion 531 is aligned with the rotating hole 4311 of the recess portion 43. A locking member 60, such as a bolt, is inserted into the second mounting hole 5311 and the pivot hole 5115 of the rotating portion 5113 thereby mounting the driving lever 53 to the handle 51. The bent portion 533 abuts the recess portion 43. The sliding shaft 535 is substantially parallel to the side plate 40. Thus, the rotating device 50 is rotatably mounted to the side plate 40.

Figure 7:
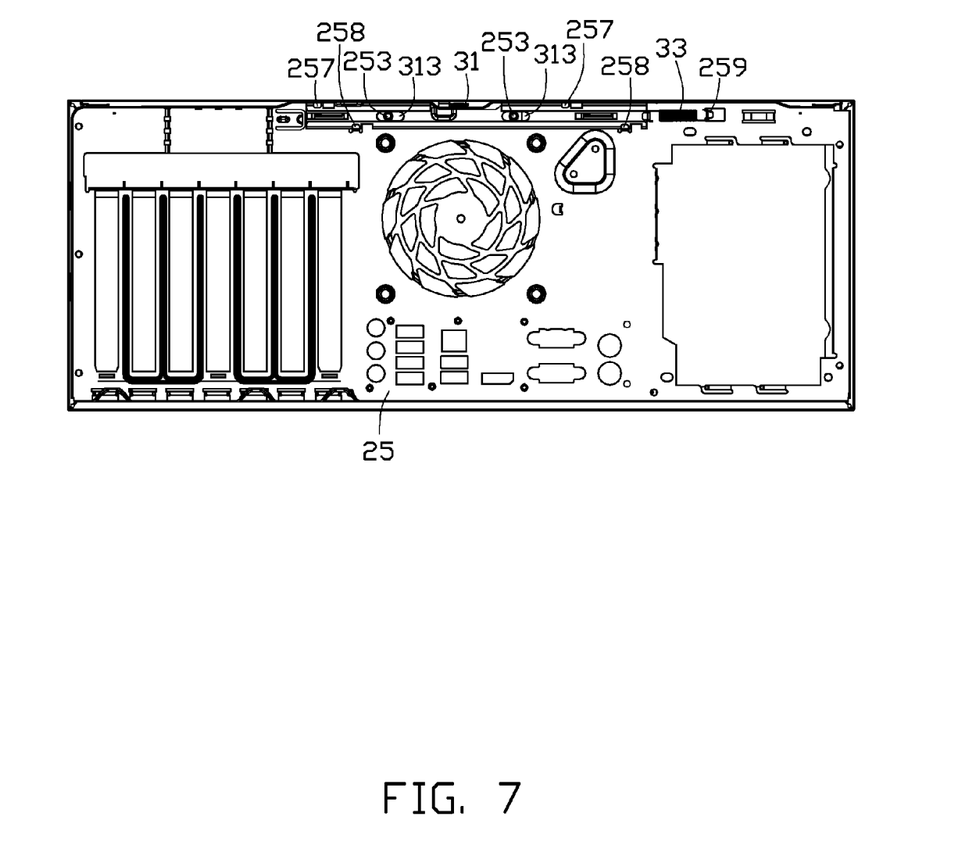
FIG. 7 is similar to FIG. 6, but showing the clipping device located in an unlocked position.

The side plate 40 is placed above the base 20 and contacts the first side plate flange 271 and the second plate flange 291 of the base 20. The rotating device 50 and the side plate flange 41 are close to the rear plate 25. The operating portion 511 of the handle 51 is pulled or pushed to make the sliding portion 5111 slide in the rotating hole 4311 thereby rotating the handle 51 in a first direction (e.g. a clockwise direction) about an axis substantially perpendicular to the side plate 40. The first blocking tab 5131 abuts and pushes the first end 551 of the second resilient member 55 so as to elastically deform the second resilient member 55. The driving lever 53 is moved in the first direction by the operating portion 511 thereby driving the clipping member 31 to slide in a third direction parallel to the side plate 40 and elastically deforming the first resilient member 33. The side plate 40 is pushed towards the front plate 23 until the two hooks 411 extend through the two through holes 255 and the two clipping holes 315. Thus, the clipping device 31 is located in an unlocked position as shown in FIG. 7. When the operating portion 511 is released, the second resilient member 55 rebounds and pushes the operating portion 511 to rotate in a second direction (e.g. an counterclockwise direction) opposite to the first direction. The driving lever 53 is moved in the second direction by the operating portion 511 and is disengaged from the clipping portion 311 of the clipping member 31. The first resilient member 33 rebounds and drives the clipping member 31 to slide in a fourth direction opposite to the third direction until the two hooks 41 are clipped by the clipping member 31. Thus, the clipping member 31 is located in a locked position as shown in FIG. 6.

In disassembly, the operating portion 511 of the handle 51 is operated to rotate relative to the rotating portion 5113. The driving lever 53 is rotated and exerts a pushing force to the clipping portion 311 thereby sliding the clipping member 31 so as to disengage the clipping member 31 from the two hooks 411. When the side plate 40 is pulled towards the rear plate 25, the side plate 40 can be disassembled from the base 20.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. An electronic device enclosure comprising:
a rear plate defining a through hole;
a side plate attached to the rear plate, wherein the side plate comprises a hook;
a clipping device comprising a clipping member and a first resilient member, wherein the clipping member is slidably mounted to the rear plate; the resilient member is engaged with the clipping member and the rear plate; the clipping member is slidable relative to the rear plate between a lock position and an unlock position; when the clipping member is located in the clock position, the hook is engaged in the through hole; when the clipping member is located in the unlock position, the hook is disengaged from the through hole; and
a rotating device rotatably coupled to the side plate; wherein the rotating device is adapted to rotate relative to the side plate thereby driving the clipping member to slide from the lock position to the unlock position; and the first resilient member is adapted to drive the clipping member to slide from the unlock position to the lock position;
wherein the clipping member comprises a clipping portion and defines a sliding hole, the rear plate comprises a post and defines a clipping hole, the post is slidably received in the sliding hole, and the clipping portion is engaged in the clipping hole.

2. The electronic device enclosure of claim 1, wherein the rear plate comprises at least two limiting portions, the clipping member defines at least two cutouts, and the at least two limiting portions extend through the at least two cutouts thereby limiting the clipping member between the at least two limiting portions.

3. The electronic device enclosure of claim 2, wherein the rear plate comprises a first hook portion, the clipping member comprises a second hook portion, one end of the first resilient member is engaged with the first hook portion, and another end of the first resilient member is engaged with the second hook portion.

4. The electronic device enclosure of claim 1, wherein rotating device comprises a handle, the handle is rotatable about an axis substantially perpendicular to the side plate, and the clipping member is slidable in a direction parallel to the side plate.

5. The electronic device enclosure of claim 4, wherein the handle comprises an operating portion, the operating portion comprises a sliding portion and a rotating portion, the side plate comprises a recess portion defining a rotating hole and a first mounting hole, the sliding portion extends through the rotating hole and is slidably engaged with the recess portion, and the rotating portion is rotatably received in the first mounting hole.

6. The electronic device enclosure of claim 5, wherein the rotating device comprises a driving lever, the driving lever comprises a mounting portion defining a second mounting hole, a locking member is inserted into the second mounting hole and the rotating portion thereby securing the driving lever to the handle, the driving lever and the operating portion are located in two opposite sides of the recess portion.

7. The electronic device enclosure of claim 6, wherein the rotating device comprises a second resilient member surrounding the rotating portion, the operating portion is operable to rotate in a first direction about an axis substantially perpendicular to the side plate to actuate the driving lever to drive the clipping member to slide to the lock position, and the second resilient member is adapted to drive the operating portion to rotate in a second direction opposite to the first direction to disengage the driving lever from the clipping member.

8. The electronic device enclosure of claim 7, wherein the operating portion comprises a supporting portion surrounding the sliding portion and the rotating portion; a first blocking tab and a second blocking tab protrude from an interior side of the supporting portion and surround the rotating portion; the second resilient member comprises a first end abutting the first blocking tab and a second end abutting the second blocking tab; and when the second resilient member is rotated, the first end is blocked by the first blocking tab thereby elastically deforming the resilient member.

9. The electronic device enclosure of claim 6, wherein the driving lever comprises a bent portion extending from the mounting portion and a sliding shaft connected to bent portion, the bent portion abuts the recess portion, and the sliding shaft is substantially parallel to the side plate.

10. The electronic device enclosure of claim 9, wherein the driving lever is substantially comma-shaped.

11. An electronic device enclosure comprising:
a base comprising a rear plate, the rear plate comprising a rear plate flange defining a through hole;
a side plate attached to the base, the side plate comprising a side plate flange bent with a hook;
a clipping device comprising a clipping member and a first resilient member, wherein the clipping member is slidably mounted to the rear plate; the resilient member is engaged with the clipping member and the rear plate; the clipping member is slidable relative to the rear plate between a lock position and an unlock position; when the clipping member is located in the clock position, the hook is engaged in the through hole; when the clipping member is located in the unlock position, the hook is disengaged from the through hole; and
a rotating device rotatably coupled to the side plate; wherein the rotating device is adapted to rotate relative to the side plate thereby driving the clipping member to slide from the lock position to the unlock position; and the first resilient member is adapted to drive the clipping member to slide from the unlock position to the lock position;
wherein the clipping member comprises a clipping portion and defines a sliding hole, the rear plate comprises a post and defines a clipping hole, the post is slidably received in the sliding hole, and the clipping portion is engaged in the clipping hole.

12. The electronic device enclosure of claim 11, wherein the rear plate comprises at least two limiting portions, the clipping member defines at least two cutouts, the at least two limiting portions extend through the at least two cutouts thereby limiting the clipping member between the at least two limiting portions.

13. The electronic device enclosure of claim 12, wherein the rear plate comprises a first hook portion, the clipping member comprises a second hook portion, one end of the first resilient member is engaged with the first hook portion, and another end of the first resilient member is engaged with the second hook portion.

14. The electronic device enclosure of claim 11, wherein rotating device comprises a handle, the handle is rotatable about an axis substantially perpendicular to the side plate, and the clipping member is slidable in a direction parallel to the side plate.

15. The electronic device enclosure of claim 14, wherein the handle comprises an operating portion, the operating portion comprises a sliding portion and a rotating portion, the side plate comprises a recess portion defining a rotating hole and a first mounting hole, the sliding portion extends through the rotating hole and is slidably engaged with the recess portion, and the rotating portion is rotatably received in the first mounting hole.

16. The electronic device enclosure of claim 15, wherein the rotating device comprises a driving lever, the driving lever comprises a mounting portion defining a second mounting hole, a locking member is inserted into the second mounting hole and the rotating portion thereby securing the driving lever to the handle, the driving lever and the operating portion are located in two opposite sides of the recess portion.

17. The electronic device enclosure of claim 16, wherein the rotating device comprises a second resilient member surrounding the rotating portion, the operating portion is operable to rotate in a first direction about an axis substantially perpendicular to the side plate to actuate the driving lever to drive the clipping member to slide to the lock position, and the second resilient member is adapted to drive the operating portion to rotate in a second direction opposite to the first direction to disengage the driving lever from the clipping member.

18. The electronic device enclosure of claim 17, wherein the operating portion comprises a supporting portion surrounding the sliding portion and the rotating portion; a first blocking tab and a second blocking tab protrude from an interior side of the supporting portion and surround the rotating portion; the second resilient member comprises a first end abutting the first blocking tab and a second end abutting the second blocking tab; and when the second resilient member is rotated, the first end is blocked by the first blocking tab thereby elastically deforming the resilient member.

* * * * *